United States Patent
Gudorf et al.

(10) Patent No.: US 7,313,621 B2
(45) Date of Patent: Dec. 25, 2007

(54) PERSONALIZED INTERFACE WITH ADAPTIVE CONTENT PRESENTATION

(75) Inventors: Gregory D. Gudorf, Mahwah, NJ (US); Philip Michael Abram, Warwick, NY (US); Marc Beckwitt, San Clemente, CA (US); Kazuaki Iso, Oradell, NJ (US); Brian Raymond, San Diego, CA (US); Brian M. Siegel, Washington, NY (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1087 days.

(21) Appl. No.: 09/858,101

(22) Filed: May 15, 2001

(65) Prior Publication Data

US 2002/0174230 A1  Nov. 21, 2002

(51) Int. Cl.
G06F 15/16 (2006.01)
(52) U.S. Cl. .......................... 709/227; 707/10
(58) Field of Classification Search ................ 709/203, 709/224, 225, 204, 227, 250, 213, 316, 219, 709/229; 705/27, 14, 10; 707/10, 3, 104; 715/500, 517; 717/175; 725/46, 35; 702/185; 600/26; 700/94
See application file for complete search history.

(56) References Cited

U.S. PATENT DOCUMENTS

| | | | |
|---|---|---|---|
| 5,720,619 A | 2/1998 | Fisslinger | 434/336 |
| 5,765,142 A * | 6/1998 | Allred et al. | 705/26 |
| 5,796,952 A * | 8/1998 | Davis et al. | 709/224 |
| 5,848,396 A | 12/1998 | Gerace | 705/10 |
| 5,855,008 A | 12/1998 | Goldhaber et al. | 705/14 |
| 5,861,881 A * | 1/1999 | Freeman et al. | 715/500.1 |
| 5,933,647 A * | 8/1999 | Aronberg et al. | 717/178 |
| 5,945,988 A * | 8/1999 | Williams et al. | 715/747 |
| 5,945,989 A | 8/1999 | Freishtat et al. | 345/329 |
| 5,984,880 A | 11/1999 | Lander et al. | 600/595 |
| 5,991,735 A | 11/1999 | Gerace | 705/10 |
| 6,014,638 A * | 1/2000 | Burge et al. | 705/27 |
| 6,018,619 A | 1/2000 | Allard et al. | 395/200.54 |
| 6,029,195 A * | 2/2000 | Herz | 725/116 |
| 6,035,332 A | 3/2000 | Ingrassia, Jr. et al. | 709/224 |
| 6,044,403 A * | 3/2000 | Gerszberg et al. | 709/225 |
| 6,066,182 A * | 5/2000 | Wilde et al. | 717/175 |
| 6,073,089 A * | 6/2000 | Baker et al. | 702/185 |
| 6,078,928 A * | 6/2000 | Schnase et al. | 707/104.1 |

(Continued)

OTHER PUBLICATIONS

Design of Time Cognizant Electronic Brokerages—Prabhudev Konanay ; icf.bus.utexas.edu/~pkonana/ps/cist/ps.*
Safeguarded Teleoperation for Lunar Rovers: From . . . —Krotkov, Simmons . . . (1996) ; www.cs.cmu.edu/afs/cs.cmu.edu/user/epk/www/workshop/krotkov.ps.gz.*

(Continued)

Primary Examiner—Thong Vu
(74) Attorney, Agent, or Firm—Wood, Herron & Evans, LLP

(57) ABSTRACT

An apparatus, program product and method personalize an on-line interface by identifying and tracking a computing environment of a user so that on-line content is tailored to the subjective preferences of the user. In addition, the computing environment advantageously includes objectively distinguishable factors such as one or more of preference settings, cookies (i.e., previously viewed web sites), time/date, location, navigation click stream, autonomic reaction to viewed on-line content and type of computer platform. Thus, one or more usage profile records for each user may be maintained, each tailored for the computing environment and user's subjective preferences when in that computing environment.

10 Claims, 7 Drawing Sheets

U.S. PATENT DOCUMENTS

| | | | |
|---|---|---|---|
| 6,102,846 A * | 8/2000 | Patton et al. | 600/26 |
| 6,456,981 B1 * | 9/2002 | Dejaeger et al. | 705/14 |
| 6,507,764 B1 * | 1/2003 | Parrella et al. | 700/94 |
| 6,557,026 B1 * | 4/2003 | Stephens, Jr. | 709/203 |
| 6,637,029 B1 * | 10/2003 | Maissel et al. | 725/46 |
| 6,654,735 B1 * | 11/2003 | Eichstaedt et al. | 707/3 |
| 6,661,340 B1 * | 12/2003 | Saylor et al. | 340/517 |
| 6,678,684 B1 * | 1/2004 | Koga et al. | 707/10 |
| 6,701,362 B1 * | 3/2004 | Subramonian et al. | 709/224 |
| 6,804,675 B1 * | 10/2004 | Knight et al. | 707/10 |
| 6,832,242 B2 * | 12/2004 | Keskar | 709/204 |
| 6,839,680 B1 * | 1/2005 | Liu et al. | 705/10 |
| 6,871,211 B2 * | 3/2005 | Labounty et al. | 709/203 |
| 6,901,437 B1 * | 5/2005 | Li | 709/219 |
| 6,981,214 B1 * | 12/2005 | Miller et al. | 715/517 |
| 7,039,699 B1 * | 5/2006 | Narin et al. | 709/224 |
| 2001/0037407 A1 * | 11/2001 | Dragulev et al. | 709/250 |
| 2002/0013850 A1 * | 1/2002 | Mitchell et al. | 709/229 |
| 2002/0059588 A1 * | 5/2002 | Huber et al. | 725/35 |
| 2002/0083145 A1 * | 6/2002 | Perinpanathan | 709/213 |
| 2002/0138331 A1 * | 9/2002 | Hosea et al. | 705/10 |
| 2004/0003132 A1 * | 1/2004 | Stanley et al. | 709/316 |

OTHER PUBLICATIONS

Customizing Mobile Applications—Schilit, Theimer, Welch (1993) ; ftp.parc.xerox.com/pub/schilit/usmlic-93-schilit.ps.Z .*

Using Filtering Agents to Improve Prediction . . . —Sarwar, Konstan . . . (1998) www.cs.umn.edu/Research/GroupLens/filterbot-CSCW98.pdf.*

OIL: An Ontology Infrastructure for the Semantic Web—Fensel, van Harmelen . . . (2001) www.cs.vu.nl/~frankh/postscript/IEEE-IS01.pdf.*

Automatic Personalization Based on Web Usage Mining—Mobasher, Cooley, Srivastava (1999) maya.cs.depaul.edu/~ mobasher/personalization/personalization.ps.*

Improving The Classroom Environment—Klinger, Finelli, Budny (2000) fie.engrng.pitt.edu/fie2000/papers/1331/pdf.*

Simulated Casualties and Medics for Emergency Training—Chi, Kokkevis, Ogunyemi . . . (1997) www.cis.upenn.edu/~hms/badler/medisim/mmvr/pdf.*

Visual Data Mining of Brain Cells—Symanzik, Ascoli, Washington . . . (1999) www.math.usu.edu/~symanzik/papers/1999_interface.ps.Z.*

* cited by examiner

PERSONALIZED INTERFACE WITH ADAPTIVE CONTENT PRESENTATION

FIELD OF THE INVENTION

The invention is generally related to computers and computer software. More specifically, the invention is generally related to a manner of providing hypertext on-line content to an Internet browser.

BACKGROUND OF THE INVENTION

Publishers of certain web sites provide a range of on-line content including links to news, reference material, shopping and search tools. Often, these web sites are referred to as "portals" intended to be a home page on an Internet browser. The wise range of on-line content is intended to increase usage by appealing to a large number of Internet users. Increased usage enhances the value of advertising presented on the web site.

To enhance usage further, some publishers of web sites personalize the on-line content for each user. The personalized web page has a number of types of on-line content that may be selected for display by each user. These preferences by the user are typically entered through preference screens that prompt the user to make selections at predefined radio button inputs and pull down lists.

The express selection of user preferences is conventionally maintained in one of three ways. First, preferences input to a web page may be stored to the local hard drive of the user's computer as a cookie accessed by the remotely accessed publisher's web site. Second, the preferences may be maintained by the remote web site and the identity of the user requested through a login screen upon subsequent visits to the web site. Third, a locally stored version of a web site browser may store the user's preferences and specifically request desired on-line content from the remote web site (i.e., "pull technology").

While the ability of a user to expressly personalize a web page is useful, often the user finds providing the information to be inconvenient. Even if the user chooses to provide the express preferences, often the user fails to update the preferences as his subjective preferences change.

In addition, often the user accesses the remote web site from different local computers. Consequently, those personalized web sites that rely upon locally stored information (e.g., cookies) fail to recognize the user's preferences, forcing the user to personalize the web site from each local computer.

One approach to automatically adjusting the on-line content for a web site has been to monitor the selections made by the user in accessing on-line content. In particular, a publisher encourages users to navigate to various on-line content through their web site and to track the navigation choices made. Often, users do not prefer to select on-line content through a web site, such as by using frames. Consequently, many times such tracking is performed by Internet Service Providers (ISPs) who track all navigation selections ("click stream") by the user.

Monitoring click streams in order to automatically adjust on-line content does not adequately anticipate the subjective preferences of each user. The circumstances that prompt a user to navigate to certain types of on-line content may abruptly change based on the context of use. In addition, the user may not even be consciously aware of a type of on-line content, and thus not navigate to those types of web sites. Consequently, the tracking of the click stream cannot anticipate this subjective preference.

Therefore, a significant need exists for an improved way to display on-line content personalized for a user.

SUMMARY OF THE INVENTION

The invention addresses these and other problems associated with the prior art by providing a method, apparatus, and program product in which on-line content is personalized to a user's subjective preferences. In particular, these subjective preferences are automatically sensed and associated with a plurality of computing environments (e.g., time, location, type of computer platform). Consequently, the changing subjective preferences of a user are reflected in personalized on-line content.

In one aspect of the invention, a computer-implemented method of displaying on-line content comprises monitoring subjective preferences of a user interacting on-line in a plurality of objectively distinguishable computing environments. A plurality of usage profiles are personalized to reflect the monitored subjective preferences for the user corresponding to each of the computing environments. Then, the personalized on-line content is presented in accordance with the usage profile appropriate for the current computing environment.

These and other advantages and features, which characterize the invention, are set forth in the claims annexed hereto and forming a further part hereof However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

The accompanying drawings, which are incorporated in, and constitute a part of this specification, illustrate embodiments of the invention and, together with the general description of the invention given above and the detailed description of the embodiments given below, serve to explain the principles of the present invention.

DETAILED DESCRIPTION

Prior to discussing specific embodiments of the invention, a brief description of exemplary hardware and software environments for use therewith is provided.

Hardware and Software Environment

Figure 1:
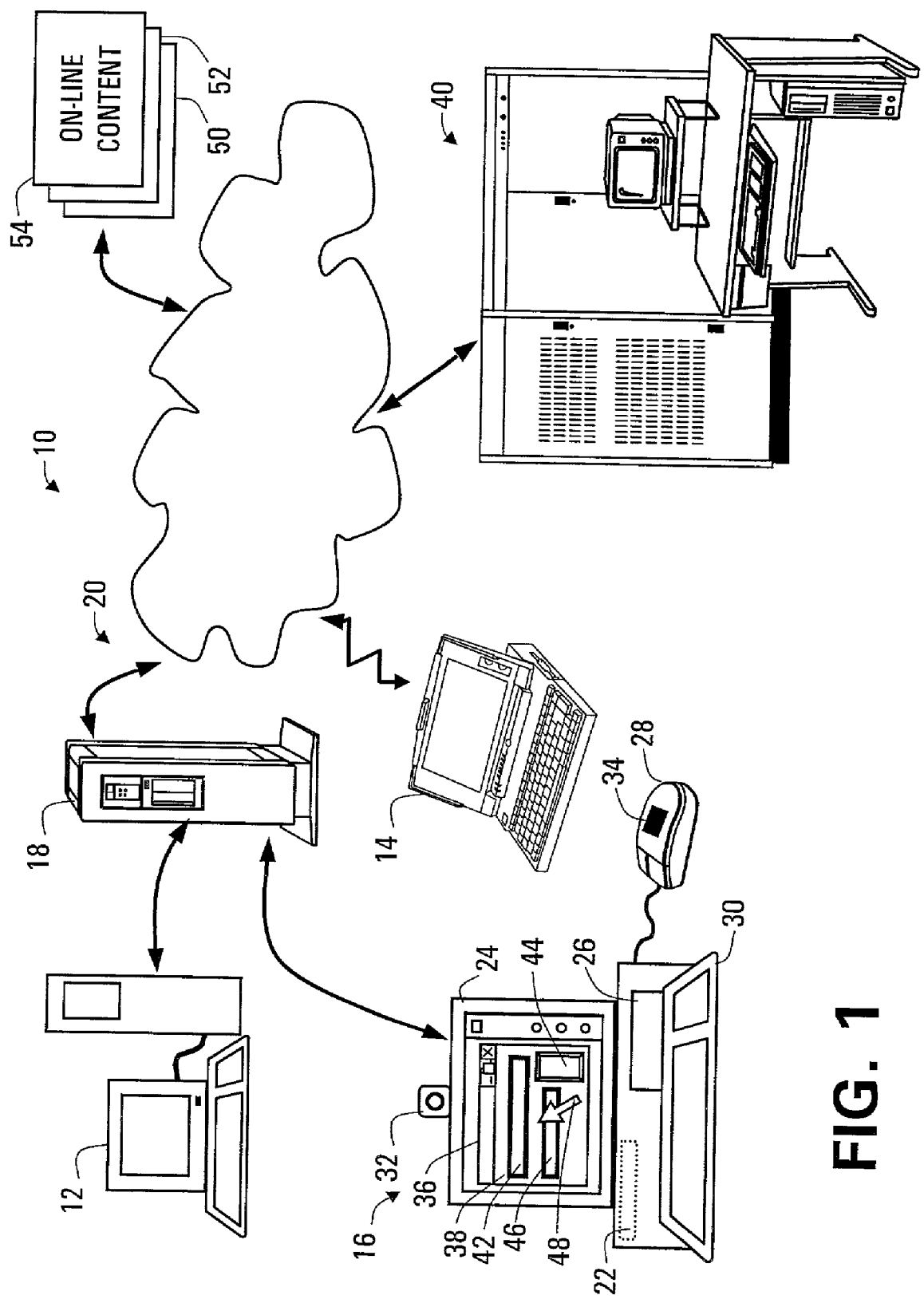
FIG. 1 is a block diagram of a computer system.

Turning to the Drawings, wherein like numbers denote like parts throughout the several views, FIG. 1 illustrates a computer system 10 consistent with the invention. Computer system 10 is illustrated as a networked computer system including one or more user computers 12, 14 and 16 (e.g., desktop or PC-based computers, workstations, etc.) coupled to server 18 (e.g., a PC-based server, a minicomputer, a midrange computer, a mainframe computer, etc.) through a network 20. Network 20 may represent practically any type of networked interconnection, including but not limited to local-area, wide-area, wireless, and public networks (e.g., the Internet). Moreover, any number of computers and other devices may be networked through network 20, e.g., multiple servers.

User computer 16, which may be similar to user computers 12, 14, may include a central processing unit (CPU), or "processor" 22; a number of peripheral components such as a computer display 24; a mass storage device 26; and various input devices (e.g., a mouse 28 and keyboard 30), among others. Server computer 18 may be similarly configured, albeit typically with greater processing performance and storage capacity, as is well known in the art.

As will be appreciated in the discussion below, user computer 16 advantageously includes user physiological detection capability, illustrated by an eye tracking video camera 32 and a galvanic skin sensor pad 34 on the mouse 28. These sensors may be used in gauging visual and tactile response, or other autonomic reaction, to on-line content.

User computer 16 accesses on-line content over network 20. In particular, the user computer 16 includes an application, such as a browser, depicted as a window 36 displayed on the computer display 24. The window 36 renders a web page 38 to the World Wide Web, provided over the network 20 as a hypertext markup language (HTML), or hypertext, document from a portal computer system 40. The web page 38 includes on-line content such as graphics, text, audio or video files. Often, the on-line content includes links 42-46 that are selectable with a cursor 48 controlled by the mouse 28. Each link 42-46 respectively identifies on-line content 50-54 accessible over the network 20, such as by a Uniform Resource Locator (URL).

Each user computer 12-16 may represent a different computing environment used by the same user. The computing environment includes objectively distinguishable factors such as type of computer, location of use, purpose for use, and time of use that affect the user's subjective preferences for on-line content. For example, user computer 12 may represent an office workstation used during weekday work hours for performing research. The user may prefer to restrict on-line content viewed to items of concern to the workplace.

The user computer 14 may represent a portable notebook computer configured for remotely accessing resources at the workplace during travel. The user computer 14 may further be used for projecting business graphics, performing word processing, scheduling, and exchanging e-mail. The user computer 14 may have data transmission, display and processing limitations that impact the user's subjective preferences for on-line content, such as preferring text-only content.

User computer 16 may represent a home desktop computer used in the evenings and on weekends for non-work related activities. Thus, the user may subjectively prefer on-line content for entertainment and formal education.

Figure 2:
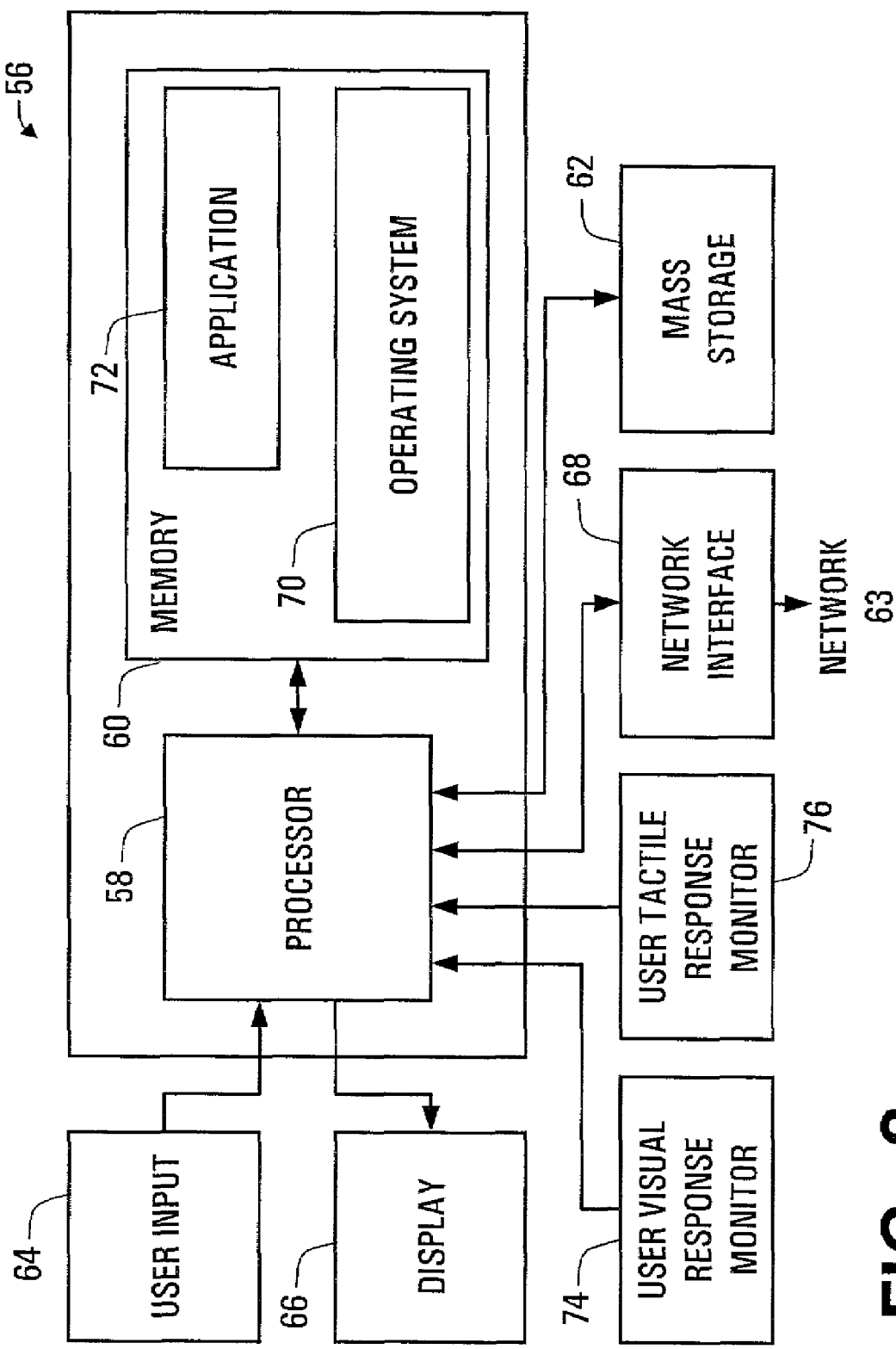
FIG. 2 is a block diagram of an exemplary hardware and software environment for a computer from the computer system of FIG. 1.

FIG. 2 illustrates in another way an exemplary hardware and software environment for an apparatus 56 consistent with the invention. For the purposes of the invention, apparatus 56 may represent practically any type of computer, computer system or other programmable electronic device, including a user computer (e.g., similar to computers 12, 14 and 16 of FIG. 1), a server computer (e.g., similar to server 18 of FIG. 1), a portable computer, a handheld computer, an embedded controller, etc. Apparatus 56 may be coupled in a network as shown in FIG. 1, or may be a stand-alone device in the alternative. Apparatus 56 will hereinafter also be referred to as a "computer", although it should be appreciated the term "apparatus" may also include other suitable programmable electronic devices consistent with the invention.

Computer 56 typically includes at least one processor 58 coupled to a memory 60. Processor 58 may represent one or more processors (e.g., microprocessors), and memory 60 may represent the random access memory (RAM) devices comprising the main storage of computer 56, as well as any supplemental levels of memory, e.g., cache memories, non-volatile or backup memories (e.g., programmable or flash memories), read-only memories, etc. In addition, memory 60 may be considered to include memory storage physically located elsewhere in computer 56, e.g., any cache memory in a processor 58, as well as any storage capacity used as a virtual memory, e.g., as stored on a mass storage device 62 or on another computer coupled to computer 56 via a network 63.

Computer 56 also typically receives a number of inputs and outputs for communicating information externally. For interface with a user or operator, computer 56 typically includes one or more user input devices 64 (e.g., a keyboard, a mouse, a trackball, a joystick, a touchpad, and/or a microphone, among others) and a display 66 (e.g., a CRT monitor, an LCD display panel, and/or a speaker, among others).

For additional storage, computer 56 may also include one or more mass storage devices 62, e.g., a floppy or other removable disk drive, a hard disk drive, a direct access storage device (DASD), an optical drive (e.g., a CD drive, a DVD drive, etc.), and/or a tape drive, among others. Furthermore, computer 56 may include an interface with one or more networks 68 (e.g., a LAN, a WAN, a wireless network, and/or the Internet, among others) to permit the communication of information with other computers coupled to the network. It should be appreciated that computer 56 typically includes suitable analog and/or digital interfaces between processor 58 and each of components 60, 62, 64, 66 and 68 as is well known in the art.

Computer 56 operates under the control of an operating system 70 resident in memory 60, and executes or otherwise relies upon various computer software applications, components, programs, objects, modules, data structures, etc. (e.g., browser application 72, among others) also resident in memory 60. Moreover, various applications, components, programs, objects, modules, etc. may also execute on one or more processors in another computer coupled to computer 56 via a network interface 68, e.g., in a distributed or client-server computing environment, whereby the processing required to implement the functions of a computer program may be allocated to multiple computers over a network.

In addition to an overtly controlled user input 64, computer 56 includes user physiological detection capabilities, depicted as a user visual response monitor 74 and a user tactile response monitor 76. Various types of user physiological parameters may be sensed and processed, such as blood pressure, pulse rate, breathing, skin conductivity, eye movement with respect to the display 66, electro-neurological activity, etc.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Personalized On-Line Interface System

An exemplary implementation of the invention in an Internet-based computing environment is discussed in greater detail hereinafter, specifically in the context of the personalized on-line interface system on the Internet, an intranet, an extranet, or even another form of public or private network, or local computer storage system. In the exemplary implementation, such functionality is implemented within an HTML-compatible web browser computer program. However, it will be appreciated that a browser consistent with the invention may also be capable of operating with other formats of storage location identifiers, as well as with other formats of viewable documents. Therefore, the invention is not limited to the particular implementation discussed herein.

Figure 3:
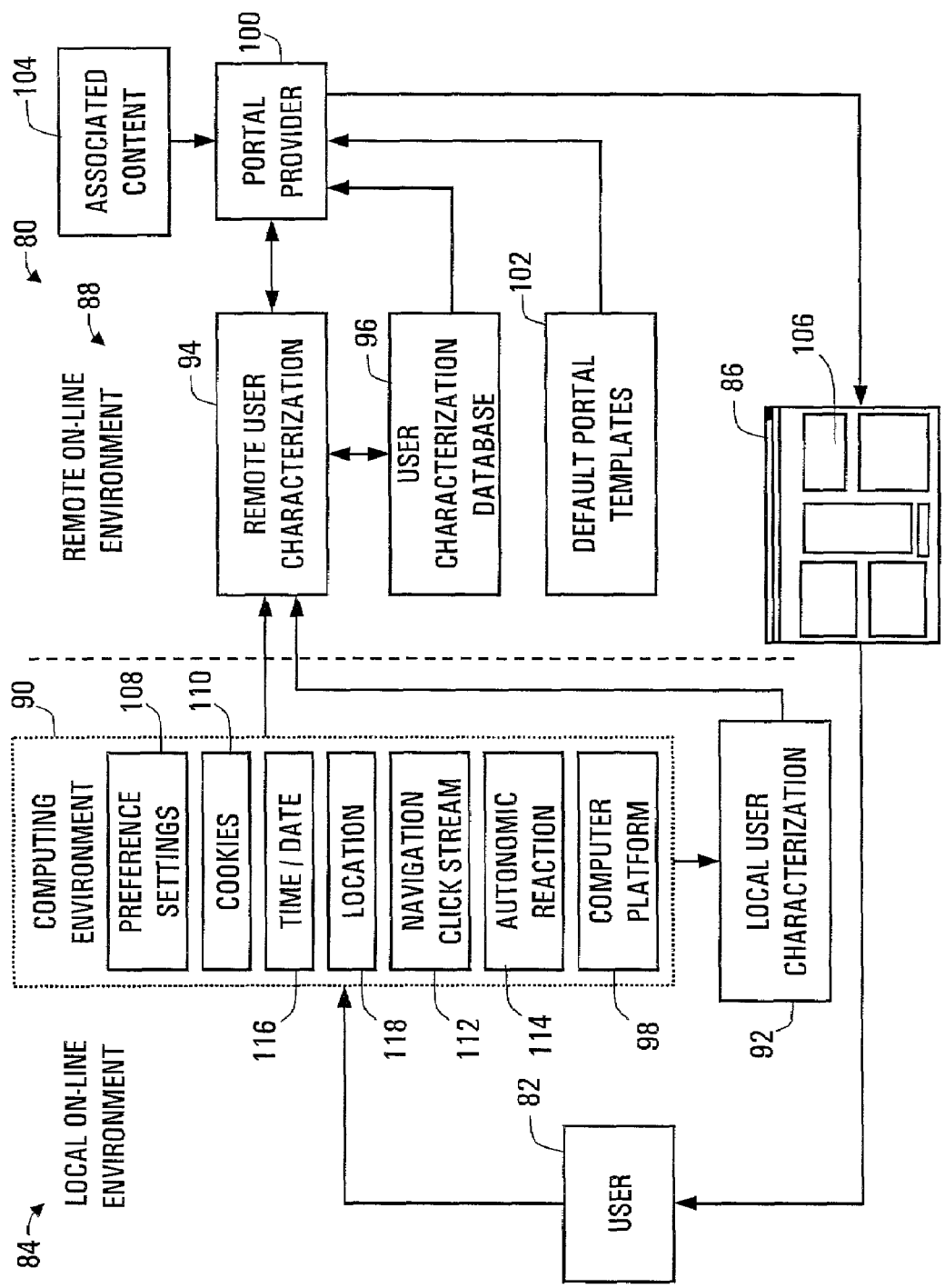
FIG. 3 is a schematic diagram of a personalized on-line interface system consistent with aspects of the invention.

With reference to FIG. 3, a personalized on-line interface system 80 advantageously assesses the subjective preferences of a user 82 in a local on-line environment 84 who accesses a hypertext document or file 86 from a remote on-line environment 88. The system 80 monitors a computing environment 90 of the user 82 with a local user characterization process 92 in order to personalize the hypertext document 86 to reflect these subjective preferences.

In particular, the local user characterization process 92 is a resident computer implemented routine for tracking and communicating the computer environment 90 to a remote user characterization process 94 in the remote on-line environment 88. The user characterization from processes 92, 94 is stored in a user characterization database 96.

The user characterization is divided between local and remote user characterization processes 92, 94 as desired for processing, confidentiality, transmission constraints and other considerations. Performing a portion of the user characterization locally advantageously reduces the amount of data necessarily transmitted to the remote on-line environment. In some instances, the type of monitoring may enhance privacy of the user may keeping certain types of user characterization information within the local on-line environment 84. Performing a portion of the user characterization remotely advantageously allows the system 80 to conveniently personalize on-line content for the user 82 who uses multiple computer platforms 98 (e.g., home desktop computer, office computer, portable device). In addition, remote user characterization 94 reduces processing requirements on the local on-line environment 84.

It should be appreciated that certain applications consistent with the invention may perform all user characterization in the local user characterization process 92 ("pull approach") or all user characterization in remote user characterization process 94 ("push approach")

The user characterization database 96 is accessed by a publisher of a web site, depicted as a portal provider 100, to personalize default portal templates 102 with associated content 104. In particular, the portal provider 100 provide matches associated content 104 with the user characterization database 96 to populate a selected default template 102 with personalized on-line content 106.

The computing environment 90 may advantageously include one or more of a number of objectively distinguishable factors that are related to the subjective preferences of the user 82. For example, expressly-input preference settings 108 form the default or initial user characterization. Cookies 110 stored on the computer platform 98 provide information as to previously viewed on-line content, which may augment ongoing tracking of navigation click stream 112. If available, autonomic reaction information 114 is correlated to currently viewed on-line content 106 to gauge user reaction.

The subjective preferences of the user 82 may predictably change based on the context of on-line use. One or more objectively distinguishable factors may be used to automatically establish a plurality of usage profiles based on these factors. Time and date information 116 may affect user subjective preferences. One or more of chronological tags (e.g., times of day, day of the week, day of the month, or day of the year) may be correlated with other objectively distinguishable information to indicate changes in usage profile. For example, the user 82 may be only interested in business related items during work hours and have other preferences during off-hours. The user 82 may have interest in tax related information during the first quarter of the year and none thereafter.

Another objectively distinguishable factor of the computing environment 90 is the computer platform 98. The user 82 may work at his office at varying times, but have a strong subjective preference to avoid displaying certain types of on-line content 106 that are of interest when at home. The workplace may have strictures against displaying non-work related on-line content 106. Another reason for varying the subjective preferences based on the computer platform 98 is hardware, software, and communication limitations of certain computer platforms 98. For example, a home computer platform 98 may use a dial up modem with low baud rate communication whereas the office computer platform 98 may use a high bandwidth Internet connection. A portable computer platform 98 such as portable digital assistant may have a limited display and user input capability that limits subjective preferences to essential on-line content 106.

Another objectively distinguishable factor of the computing environment 90 to characterize one or more usage profiles is a location 118 of the local on-line environment 84. The system 80 may be able to determine the location 118 due to user input, network node through which the user 82 is accessing the remote on-line environment 88, triangulation data from a wireless connection, or other means.

Figure 4:
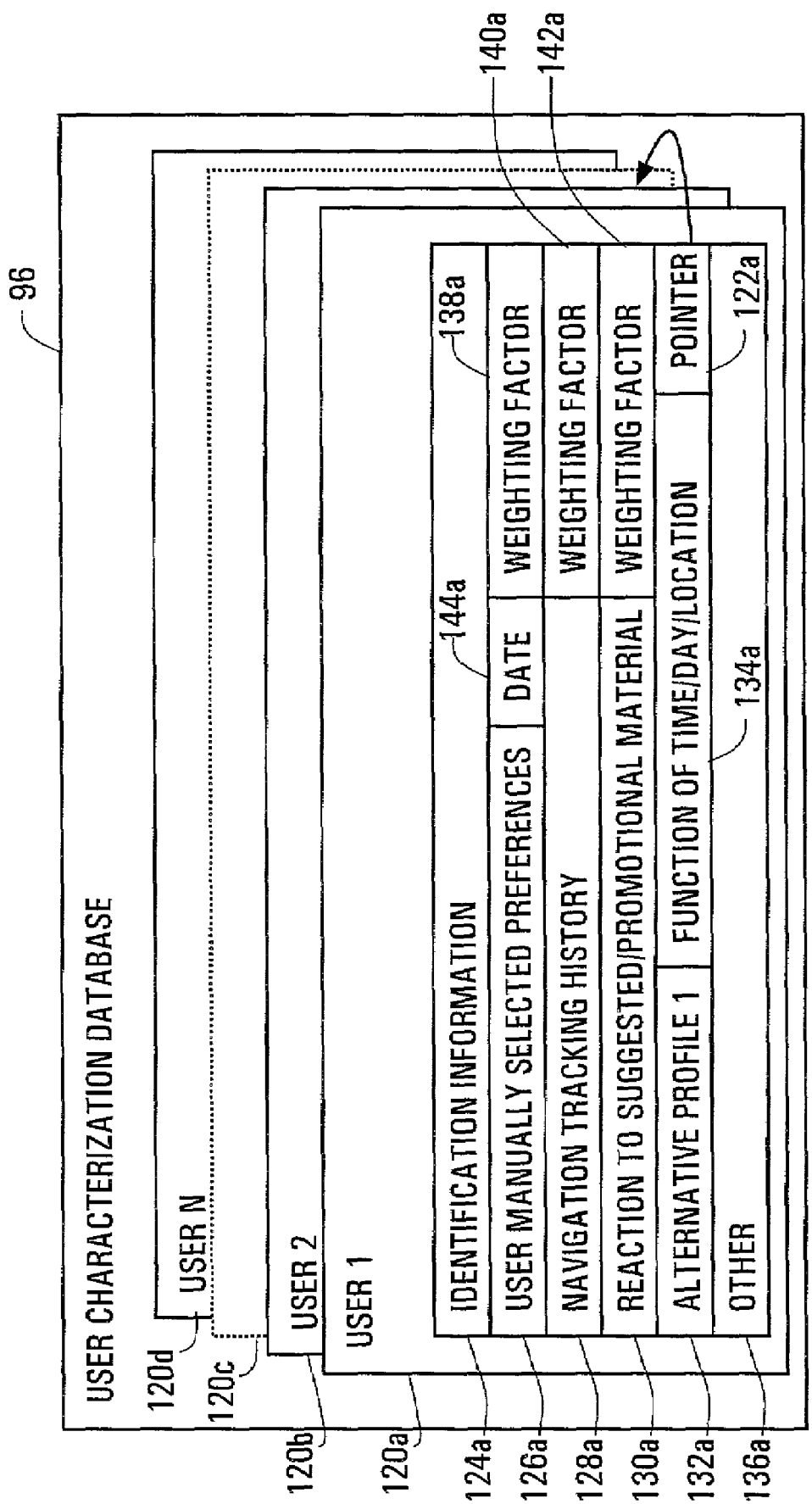
FIG. 4 is a data structure for the user characterization database of FIG. 3.

With reference to FIG. 4, a data structure for the user characterization database 96 includes a plurality of usage profile records 120a-120d. Each user 82 may have one or more usage profile records 120a-120d. For example, a "user 1" record 120a includes a pointer field 122a that references a "user 2" record 120b.

Each usage profile record 120a-120d includes a user characterization based on the computing environment 90. For instance, an identification information field 124a allows correlation of a user 82 to an appropriate usage profile record 120a. The identification information field 124a may advantageously include features to ensure confidentiality of each user 82. A user manually selected preferences field 126a contains the preference settings 108. A navigation tracking history field 128a contains data from cookies 110 and/or navigation click stream 112. A reaction to suggested/promotional material field 130a may contain autonomic reaction information 114 to on-line content 106 such as advertising banners or feedback as to interaction by the user 82, such as purchases, at associated web sites.

It should be appreciated that each usage profile record 120a-120d may advantageously include a plurality of data records that are periodically assessed to determine whether a new usage profile record should be created, such as at 120c. Creation of a new record 120c may be warranted due to a significant change in assessed subjective preference under certain circumstances. For instance, an alternative profile field 132a may contain detailed objectively distinguishable information tagged by factors such as time, day and location information 134a that show a change in subjective preferences as a function of one or more factors.

Alternatively, a new usage profile record 120c may be created for a predetermined one or more objectively distinguishable factors of the computing environment 90, regardless of whether the assessed subjective preferences appear to change. For instance, each computer platform 98 used may prompt creation of a new usage profile record 120c. Over time, each profile record 120a-120c would thus change if the subjective preferences are in deed different for the different computing environment 90. In addition, each usage profile record 120a-120d may contain other information fields 136a.

Each of the fields 124a-136a may include a weighting factor field, such as at 138a-142a in order to combine a plurality of objectively distinguishable factors. Furthermore, the weighting factor field 138a-142a may be fixed, or change over time. For example, a date field 144a indicates the last time that the user provided the manually selected preferences 126a. Based on the date field 144a, the weighting factor field 138a is adjusted over time to give less weight to an older, and thus presumably more out-of-date, manually selected preferences 126a.

Figure 5:
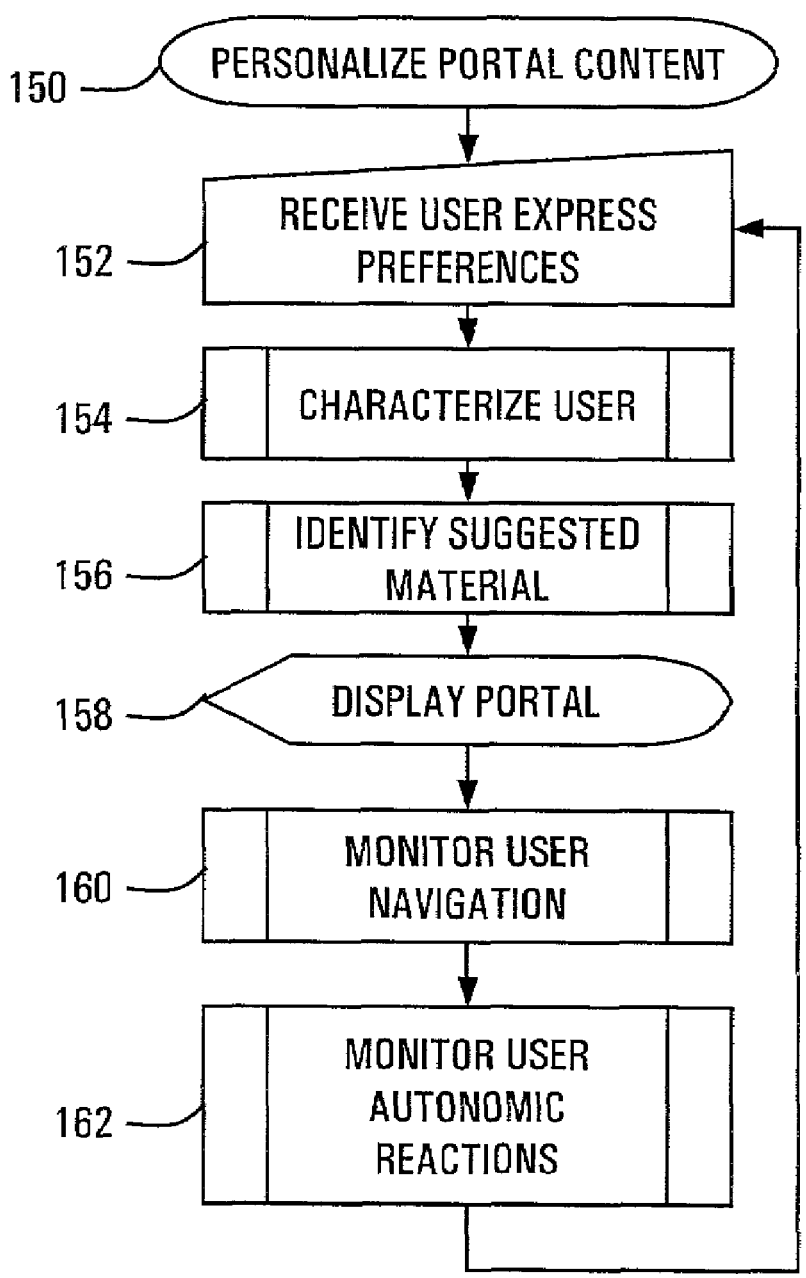
FIG. 5 is a flowchart illustrating a main routine executed by the personalized on-line interface system of FIGS. 3-4.

FIG. 5 illustrates a personalize portal content routine 150 executed by the personalized on-line interface system 80 of FIG. 3. Express preferences of a user are received (block 152). The subjective preferences of the user are characterized based on received objectively distinguishable factors, which at this point is limited to express preferences (block 154). On-line content is identified that is related to the user characterization (block 156) and displayed on the portal web page provided to the user (block 158). Thereafter, the user is monitored, such as by monitoring user navigation (block 160) and monitoring user autonomic reactions (block 162). The routine 150 repeats, continually updating user characterization based on express or monitored information.

Figure 6:
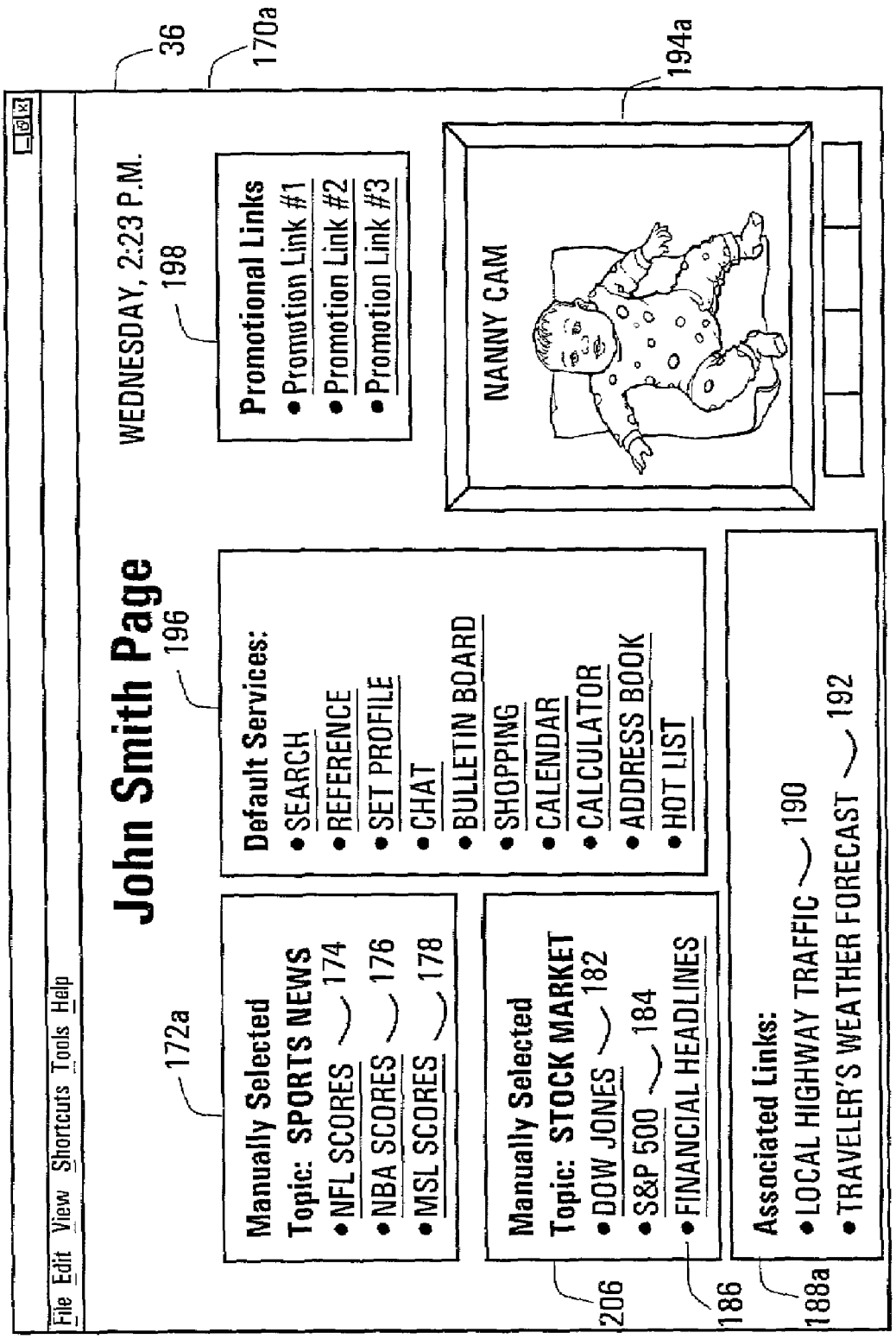
FIG. 6 is a depiction of a browser window personalized by the personalized on-line interface system of FIGS. 3-5 with on-line content for a first user environment.
Figure 7:
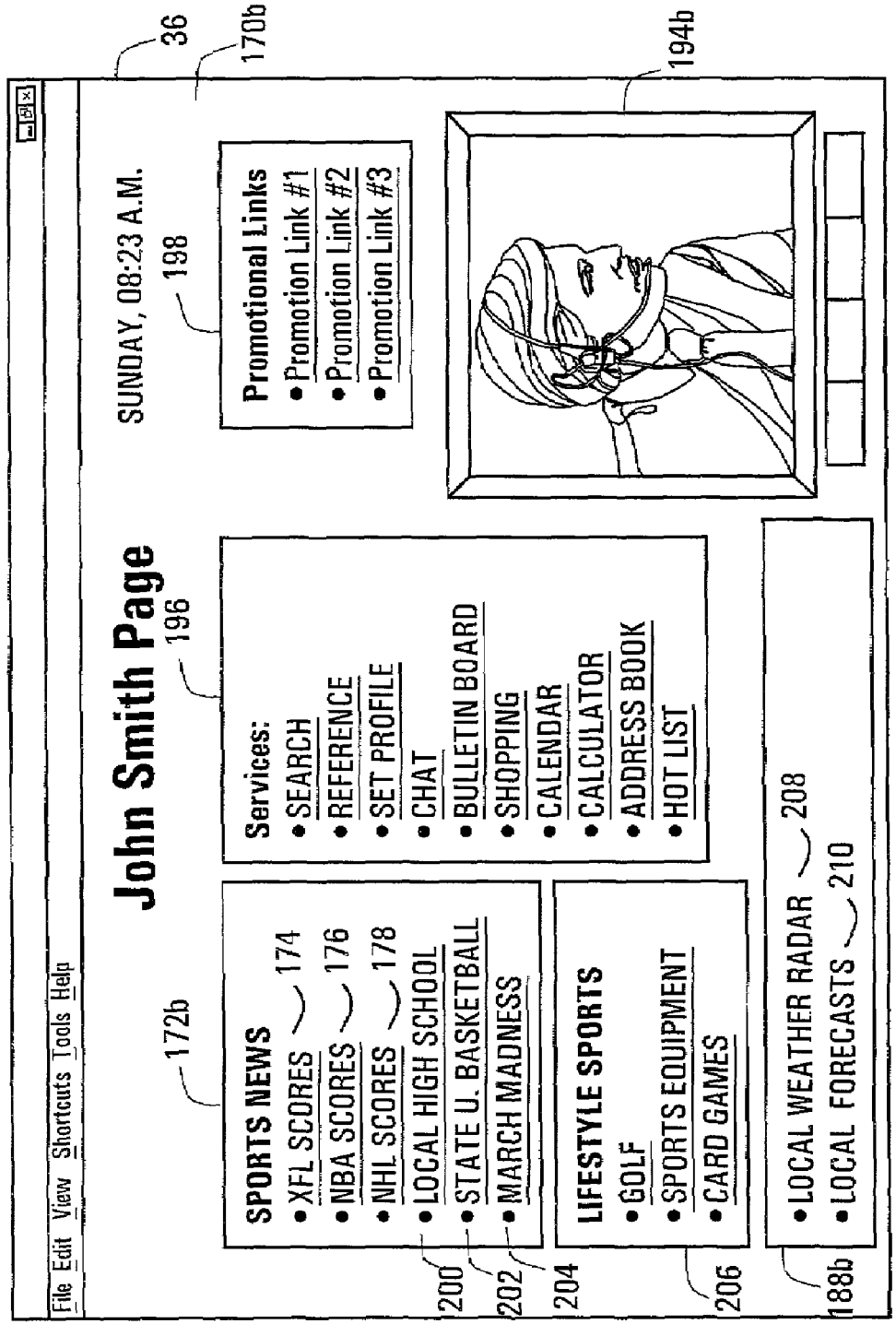
FIG. 7 is a depiction of a browser window personalized by the personalized on-line interface system of FIGS. 3-5 with on-line content for a second user environment.

FIGS. 6 and 7 illustrates the personalized on-line interface system 80 used to personalize web pages 170a, 170b respectively in a browser window 36. With reference to FIG. 6, a user 82 ("John Smith") accesses the remote on-line environment 88 during work hours from an office computer 12 that lacks response monitors 74, 76. The usage profile, characterized for this workplace computing environment, is based on a combination of navigation click stream 112, preference settings 108 and computer platform 98. The user 82 prefers brief display of sports-related on-line content 106 such as brief sports news 172a with links to "NFL scores" 174, "NBA scores" 176 and "MSL scores" 178. The user 82 further prefers work-related references such as "Stock market" information 180 which includes links to "Dow Jones" 182, "S&P 500" 184, and "Financial headlines" 186.

An "associated links" on-line content 188a is tailored to work travel, such as with a local highway traffic report link 190 and a traveler's weather forecast 192 for business air travel. These links 190, 192 may advantageously tailor to specific routes of interest due to navigation click stream.

The workplace web page 170a further includes nontextual on-line content that is tailored to the subjective preferences of the user 82, such as depicted by "nanny cam" streaming video monitor 194a for checking on children at day care.

The workplace personalized web page 170a includes a standardized list of reference links ("default services") 196 and promotional links 198. These links 196, 198 may be provided without previous user expressed or implied preference as a way of exposing the user to additional features.

With reference to FIG. 7, the user 82 is in a different computing environment for which a different personalized web page 170b is provided. For example, the time, day of the week, and computing platform indicate that the user 82 prefers detailed sports news when in this computing environment. Thus, "Sports News" 172b has additional links to "Local high School", "State U. basketball", and "March Madness" on-line content 200-204. These links are preferably associated with date ranges during the year and are appropriately replaced with seasonal sports links during other seasons.

The "Lifestyle sports" feature 206 suggests associated on-line content 104 that is presented based on related items selected by the user 82. This content may also be determined based on autonomic reaction to on-line content. Also, weather links 188b reflects that different type of weather information is preferred at in this computing environment, including "local weather radar" link 208 and "local forecasts" link 210. In addition, the nontextual on-line content has been changed from the "nanny cam" streaming video monitor 194a to another service 194b.

By virtue of the foregoing, there is thus provided a personalized on-line interface system 80 which identifies and tracks the computing environment 90 of a user 80 so that on-line content 106 is tailored to the subjective preferences of the user 82. In addition, the computing environment 90 advantageously includes objectively distinguishable factors such as one or more of preference settings 108, cookies (i.e., previously viewed web sites) 110, time/date 116, location 118, navigation click stream 112, autonomic reaction 114 to viewed on-line content and computer platform 98. Thus, one or more usage profile records 120*a*-120*b* for each user 82 may be maintained, each tailored for the computing environment 90 and user's subjective preferences when in that computing environment 90.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, tailoring of on-line content may include subject matter provided for any of the senses rather than predominantly visual information. For another example, the personalized on-line interface system 80 may include tracking disabilities of the user 82 to further optimize the on-line content 106.

The invention in its broader aspects is, therefore, not limited to the specific details, representative apparatus and method, and illustrative examples shown and described. Accordingly, departures may be made from such details without departing from the spirit or scope of the general inventive concept.

The invention claimed is:

1. A method of displaying on-line content, the method comprising:
    monitoring subjective preferences of a user interacting on-line with a remote computing system that is remote from the user, while the user is in one of a plurality of objectively distinguishable local computing environments that is local to the user;
    personalizing and storing a plurality of usage profiles in the remote computing system to reflect the monitored subjective preferences for the user corresponding to each of the local computing environments; and
    presenting on-line content personalized in accordance with one of the usage profiles in response to the user interacting in an identified one of the local computing environments.

2. The method of claim 1, wherein monitoring subjective preferences of the user further comprises:
    determining a unique computing environment by identifying at least one characteristic selected from the group consisting of time of day, day of the week, date, computing location, and computing platform.

3. The method of claim 2, further comprising:
    creating a new usage profile in response to identifying a unique computing environment monitored subjective preferences.

4. The method of claim 2, wherein personalizing the plurality of usage profiles to reflect the monitored subjective preferences for the user corresponding to each of the computing evironments further comprises:
    creating a new usage profile for the user in response to a comparison of subjective preferences of the user in a one computing environment with subjective preferences of the user in another computing environment.

5. The method of claim 1, wherein monitoring subjective preferences of the user interacting on-line further comprises:
    detecting a user physiological response to on-line content.

6. The method of claim 5, wherein detecting the user physiological response to on-line content further comprises detecting eye movement of the user.

7. The method of claim 5, wherein detecting the user physiological response to on-line content further comprises detecting a galvanic skin response.

8. An apparatus, comprising:
    a memory; and
    a program stored in the memory and configured to monitor subjective preferences of a user interacting on-line in a plurality of objectively distinguishable remote computing environments separate from the local computing environment executing the program, to personalize a plurality of usage profiles to reflect the monitored subjective preferences for the user corresponding to each of the remote computing environments, and to present on-line content personalized in accordance with one of the usage profiles in response to the user interacting in an identified one of the remote computing environments.

9. A program product, comprising:
    a program configured to monitor subjective preferences of a user interacting on-line in a plurality of objectively distinguishable remote computing environments separate from the local computing environment executing the program, to personalize a plurality of usage profiles to reflect the monitored subjective preferences for tbe user corresponding to each of the remote computing environments, and to present on-line content personalized in accordance with one of the usage profiles in response to the user interacting in an identified one of the remote computing environments; and
    a signal bearing medium bearing the program.

10. The program product of claim 9, wherein the signal bearing medium includes at least one of a recordable medium and a transmission medium.

* * * * *